(No Model.)

L. GRISCOM.
STUB END FOR CONNECTING RODS.

No. 328,885. Patented Oct. 20, 1885.

Witnesses:
David S. Williams
William F Davis

Inventor:
Lewis Griscom
by his Attorneys
Howson and Sons

UNITED STATES PATENT OFFICE.

LEWIS GRISCOM, OF POTTSVILLE, PENNSYLVANIA.

STUB END FOR CONNECTING-RODS.

SPECIFICATION forming part of Letters Patent No. 328,885, dated October 20, 1885.

Application filed September 14, 1885. Serial No. 176,988. (No model.)

*To all whom it may concern:*

Be it known that I, LEWIS GRISCOM, a citizen of the United States, residing in Pottsville, Schuylkill county, Pennsylvania, have invented certain Improvements in Stub Ends for Connecting-Rods, of which the following is a specification.

The object of my invention is to so construct the "stub ends" of connecting-rods of steam and other engines and machines that the bearing metals will not bind on the crank-pins when they become heated, and this object I attain, as fully described hereinafter.

Figure 1:
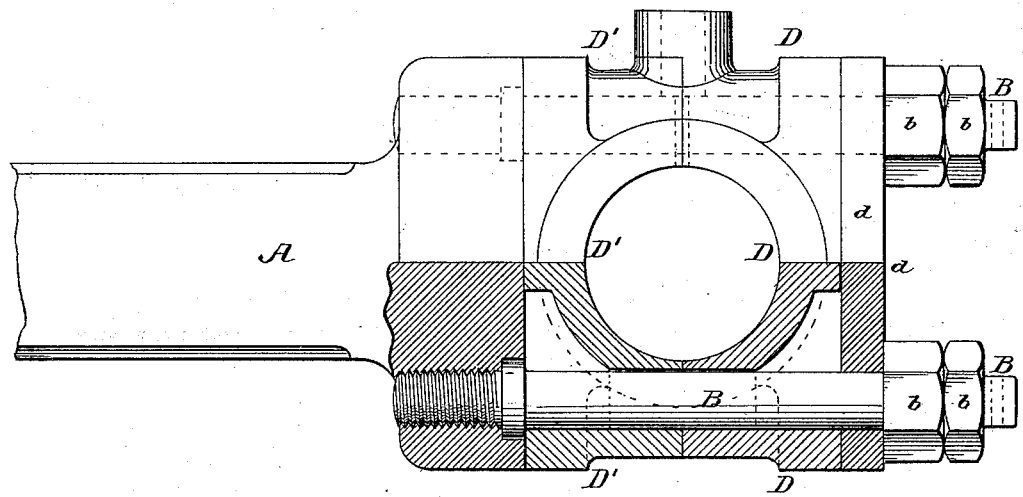
Figure 2:
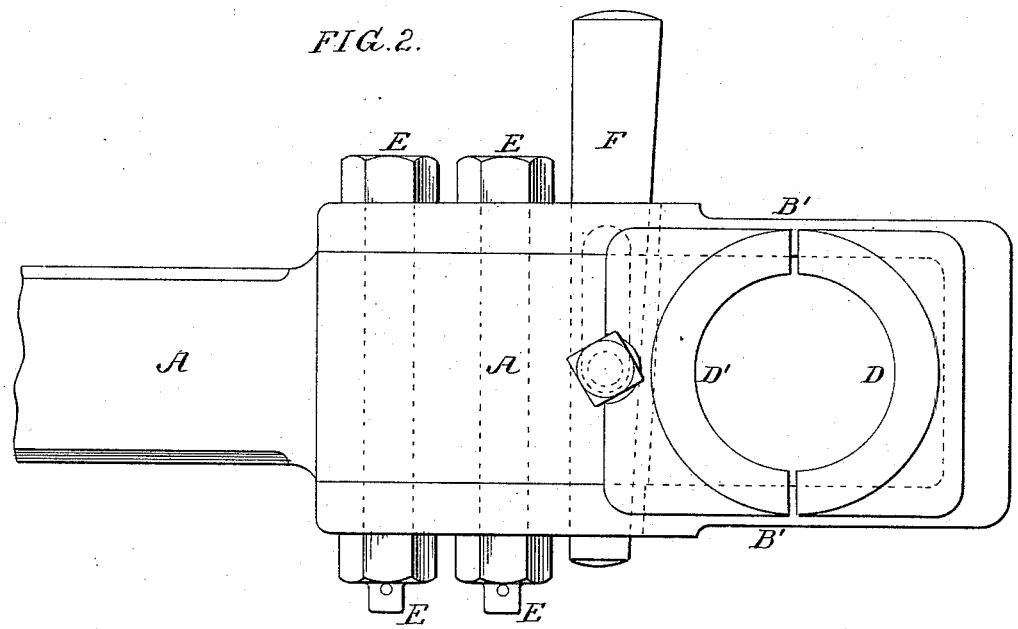

My invention may be applied to various constructions of stub ends, and in the accompanying drawings I have shown it applied to two different forms, Figure 1 being a side view, partly in section, of one form, and Fig. 2 a side view of another form.

In the construction shown in Fig. 1, A is the connecting-rod, into the end of which are screwed or otherwise secured bolts B B, provided at their outer ends with nuts $b$ $b$, between which and the end of the rod are confined the two half-bearings D D' and retaining cross-plate $d$ $d$.

In the construction shown in Fig. 2 the two half-bearings D D' are held in place by the strap B', which is secured to the end of the connecting-rod by suitable bolts and nuts, E E, and a setting-up wedge, F. In the ordinary construction of these stub ends the bearing-pieces D D' are of brass, and the confining bolts or straps of iron or steel. When the crank-pin begins to heat, and consequently increase in diameter, the bearing brasses become heated also, and must necessarily expand, but being confined by the bolts or straps of iron or steel, which metals have a less ratio of expansion than the brass, the bearings cannot expand outward by stretching the iron or steel straps or bolts, and must therefore expand inward. The brasses thus tend to bind on the crank-pin and increase the difficulty caused by the heating from lack of oil or other cause, in some cases resulting in the direct stoppage of the engine. To remedy this difficulty, I construct the bolts or straps which confine or retain the bearings of a metal which has the same ratio of expansion as the bearings themselves, and a greater rate of expansion under heat than the crank-pin, and for this purpose I make use of phosphor-bronze, which has sufficient tensile strength to stand the strain, though any other alloy or metal having the same properties can be used instead of phosphor-bronze.

With this construction, when from any cause the crank-pin and its bearings begin to heat and expand, the heat communicated to the retaining bolts or straps will cause the latter to expand also and at a greater rate than the pin, thus relieving the bearing just when needed, so that when the pin becomes heated the engine will not be stopped, but will continue running and will give opportunity to the bearings to cool down without stopping the engine.

I claim as my invention—

The stub end for the crank-pins of engines and other machines, said stub end having bearings and confining bolts or straps of a metal having a greater ratio of expansion than the crank-pin, substantially as described.

In testimony whereof I have signed my name to this specification in the presence of two subscribing witnesses.

LEWIS GRISCOM.

Witnesses:
JNO. P. GRISCOM,
THOS. W. QUIN.